SIMULTANEOUS RECORDING OF TWO SIGNALS PER CHANNEL

Original Filed Dec. 21, 1962 2 Sheets-Sheet 1

FREQUENCY DISTRIBUTION OF SIGNALS ON RECORDING MEDIUM

INVENTOR.
Kenjiro Takayanagi
BY
Pierce, Scheffler & Parker
Attorneys

SIMULTANEOUS RECORDING OF TWO SIGNALS PER CHANNEL

Original Filed Dec. 21, 1962 2 Sheets-Sheet 2

CHARACTERISTICS CURVE DIAGRAM OF DISCRIMINATOR

INVENTOR
Kenjiro Takayanagi
BY
Pierce, Scheffler & Parker
Attorneys 3,401,237
SIMULTANEOUS RECORDING OF TWO SIGNALS PER CHANNEL Kenjiro Takayanagi, Kanagawa-ku, Yokohama, Japan, assignor to Victor Company of Japan, Limited, Yokohama, Japan, a corporation of Japan
Continuation of application Ser. No. 246,607, Dec. 21, 1962. This application June 23, 1967, Ser. No. 651,938
Claims priority, application Japan, Aug. 27, 1962, 37/36,686
3 Claims. (Cl. 179—100.4)

ABSTRACT OF THE DISCLOSURE

A system for multiple recording and reproducing comprises two stereophonic sound signals, a control signal and means responsive to said control signal for modulating one of said signals to create a first frequency modulated signal. The sidebands of this modulated signal have lower frequencies than the frequency band range of said stereophonic sound signals. The system includes an oscillator means producing a signal of constant frequency, which frequency differs by predetermined cycles from the carrier frequency of said first frequency modulated signal. The system further includes a first channel transmitting the sum of said first frequency modulated signal and one of said stereophonic sound signals, a second channel transmitting the sum of said constant frequency signal and the other of said stereophonic sound signals, means for recording the signals from both said channels in a single recording medium, means for reproducing the recorded signals from said recording medium, first low pass filter means for separating said first frequency modulated signal from one of the reproduced signals, second low pass filter means for separating said constant frequency signal from the other of said reproduced signals, means for producing a second frequency modulated signal, the carrier frequency thereof being said predetermined cycles, and discriminator means for reproducing said control signal from said second frequency modulated signal.

This application is a continuation of the applicant's prior application, Ser. No. 246,607, filed Dec. 21, 1962, now abandoned.

This invention relates to a multiple recording and reproducing system for simultaneously recording and reproducing on the same recording medium at least two main signals having substantially the same frequency band and at least one additional signal to be added thereto.

In a conventional system of this type, a magnetic tape is used for the recording medium and, by means of three or more heads, as many kinds of signals as said heads are recorded and reproduced on said tape. However, such system has many defects in that, since as many recording tracks as the signal kinds are required, the space efficiency of the recording medium is very low, as many costly recording and reproducing mechanisms (such as recording heads and reproducing heads) as the recording tracks are required and the entire apparatus is expensive and that, in case an ordinary recording disk is used for the recording medium, in the present stage, it will be impossible to record and reproduce three or more kinds of signals.

The present invention has been made with a view to eliminating the above mentioned defects.

A main object of the present invention is to provide a so-called compatible multiple recording and reproducing system wherein additional signals such as, for example, central sound signals or back ground or other sound-effect signals for three-dimensional stereo instruments or control signals for any other instruments are added separately from two recorded main signals on such recording medium as a magnetic tape and, when the recorded signals on said recording medium are reproduced with an ordinary reproducing apparatus, only said two main signals will be reproduced and, when they are reproduced with a special reproducing apparatus, said main signals and additional signals will be able to be reproduced.

Figure 1:
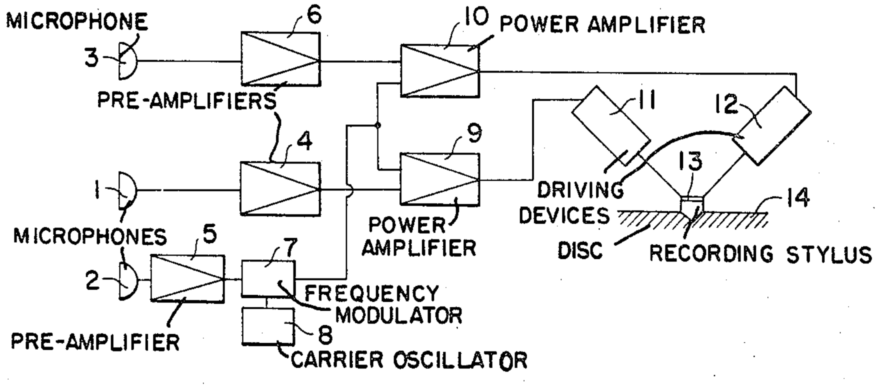
FIGURE 1 is a schematic diagram of a signal recording apparatus according to one embodiment of the multiple recording and reproducing system of the present invention.

The present invention shall be detailed in the following with reference to the respective embodiments in the drawings.

Figure 2:
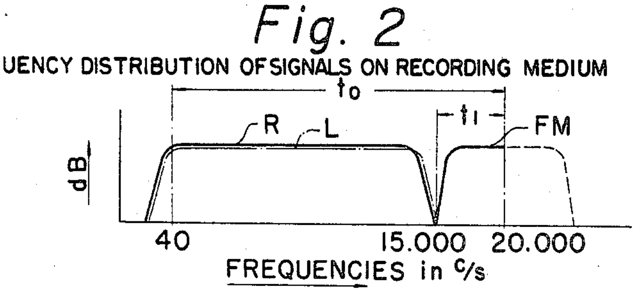
FIGURE 2 is a diagram showing the frequency distribution of signals recorded with the above mentioned apparatus on a recording medium.
Figure 3:
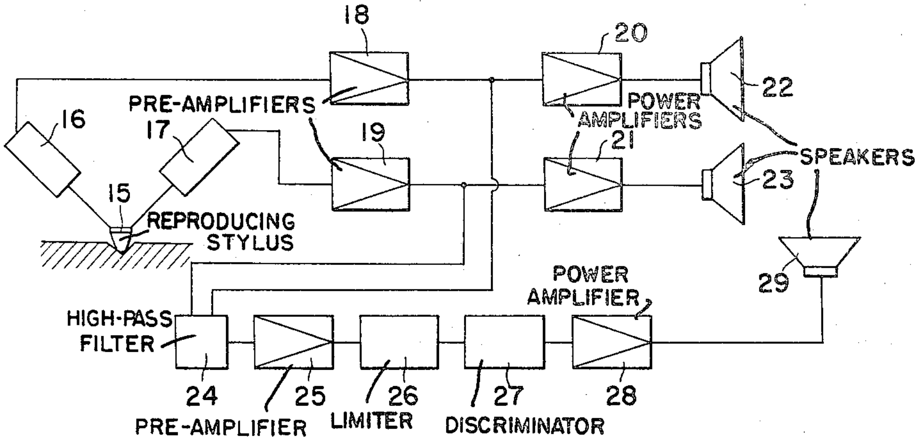
FIGURE 3 is a schematic diagram of a signal reproducing apparatus according to the first embodiment of the multiple recording and reproducing system of the present invention.

The first embodiment shown in FIGURES 1 to 3 is of the system of the present invention as applied to a 45—45 system stereo record to be used for multichannel transmission. In drawings, 1, 2 and 3 are microphones, 4, 5 and 6 are preamplifiers, 7 is a frequency modulator, 8 is a carrier oscillator, 9 and 10 are power amplifiers, 11 and 12 are driving devices for a cutting stylus 13. They are connected correlatively as illustrated. 14 is a lacquer disk.

FIGURE 2 shows the frequency distribution of signals on a recording medium, *d*B being taken on the ordinate and frequencies being taken on the abscissa. If the frequency range that can be recorded on said lacquer disk 14 is 40 to 20,000 c./s., the frequency range of ordinary stereo sounds in said frequency range will be the range represented by curves R and L and other signals frequency modulated (FM), will be recorded in the no-signal highest range section $f_1$.

Now a method of recording the FM signals and the above mentioned two signals shall be described.

Two desired sounds (which are usually sounds on the right and left of a sound source) are picked up respectively with the microphones 1 and 3. Electric currents generated by these sounds are applied to the driving devices 11 and 12 through the preamplifiers 4 and 6 and power amplifiers 9 and 10, respectively, and are cut in the lacquer disk 14. At the same time, additional sounds such as, for example, central sounds from said sound source or effect-sounds produced from the circumference or back ground are picked up by the microphone 2. An electric current generated by these sounds is amplified with the preamplifier 5, and is frequency modulated by means of the frequency modulator 7 and carrier oscillator 8. It is then amplified with said power amplifiers 9 and 10, is applied to the driving devices 11 and 12 and is cut together with said two signals in the lacquer disk 14.

The frequency of said carrier may be selected to be in the middle of the FM frequency band but, in order to widen the reproduced signal band, it is preferable to be selected at the highest frequency that can be reproduced or about 20,000 c./s. in this case. In other words, the sounds are recorded by utilizing the lower sideband of FM signals. Thus, the respective signals will be recorded on the laquer disk 14 in the range shown in FIGURE 2.

Figure 4:
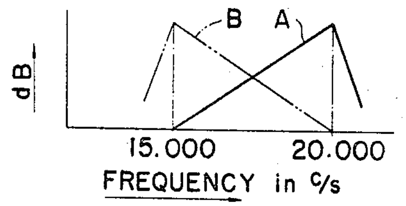
FIGURE 4 is a characteristics curve diagram of a discriminator used in said apparatus.

A method of reproducing the recorded signals shall now be described. For this purpose, such apparatus as is shown in FIGURE 3 is used. In FIGURE 3, 15 is a reproducing stylus, 16 and 17 are elements, 18 and 19 are preamplifiers, 20 and 21 are power amplifiers, 22 and 23 are speakers, 24 is a high-pass filter, 25 is a preamplifier, 26 is a limiter, 27 is a discriminator, 28 is a power amplifier and 29 is a speaker. The recorded signals picked up with the reproducing stylus 15, are converted into electric signals with the elements 16 and 17, and then are passed to the power amplifiers 20 and 21 through the preamplifiers 18 and 19 and drive the speakers 22 and 23, respectively. The sounds that can be heard in such case are only the above mentioned two main signals. On the other hand, the above mentioned FM signals are taken out of the output ends of the preamplifiers 18 and 19, are applied to the preamplifier 25 through the high-pass filter 24, are passed through the limiter 26, are converted into AM signals with the discriminator 27, are then transmitted to the power amplifier 28 and drive the speaker 29. Further, said discriminator 27 having such characteristics as are represented by the curve A or B in FIGURE 4 is effective. In order to record such high frequency as is mentioned above on a stereo record, the frequency band of the cutting device should be made wider than is used today, the point radius of the reproducing stylus should be less than about 0.5 mil and the needle pressure should be less than about 3 grs. These criteria can be easily met in view of the current technical level.

In the above mentioned embodiment, as the additional signals recorded as mentioned above have a frequency band of about 5,000 c./s., they can be used for the central sounds for three-dimensional stereo reproduction as described above and various effect-sounds and other sounds from the back ground or the right and left can be recorded. Further, the FM signal is not limited to be one but two signals should be able to be recorded respectively on the two recording walls of a stereo groove. However, as different from the case of the below mentioned magnetic tape, in this kind of stereo record, in such high frequency section as is mentioned above, the cross-talk becomes so high that both signals will be mixed. Therefore, in fact, it seems to be difficult to record two kinds of signals respectively on the two recording walls.

Figure 5:
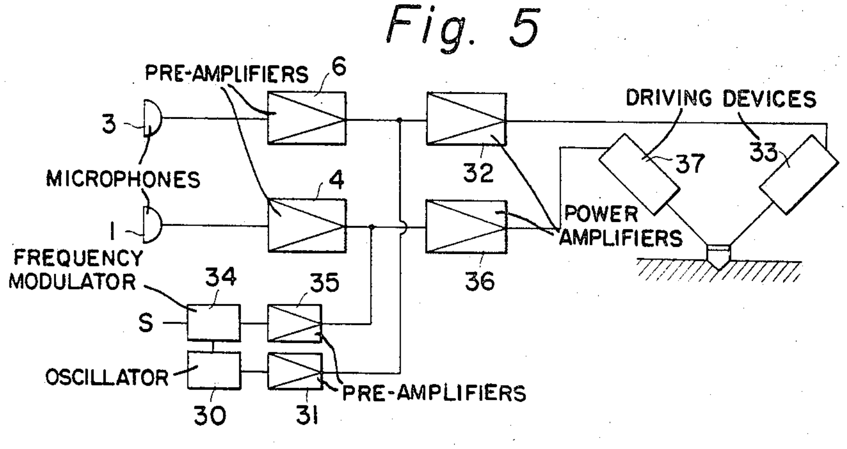
FIGURE 5 is a schematic diagram of a signal recording apparatus according to a second embodiment of the present invention.
Figure 6:
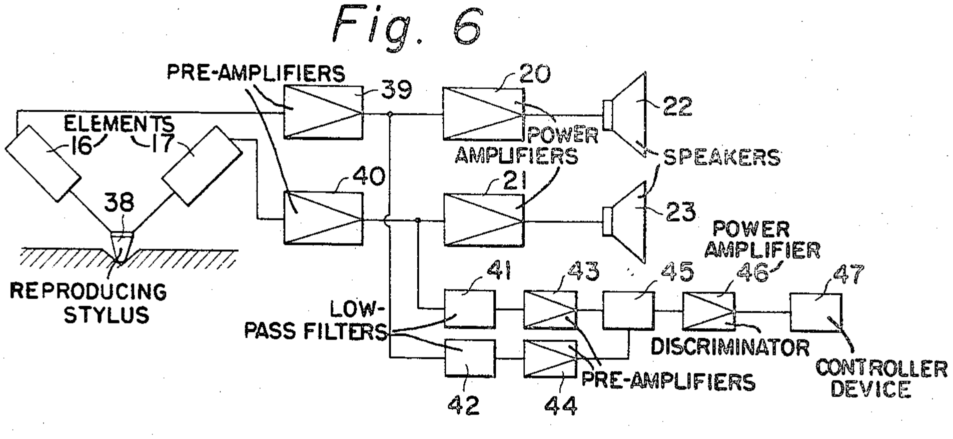
FIGURE 6 is a schematic diagram of a reproducing apparatus according to said second embodiment.

The second embodiment shown in FIGURES 5 and 6 shall now be explained. In this embodiment, which is different from the above mentioned first embodiment, signals having had the frequency modulated to the lowest range frequency section (for example, less than 40 c./s.) are to be recorded. The recording and reproducing means are substantially the same as in the above mentioned first embodiment. In such case, it is necessary to bring down the low range frequency limit that can be recorded on a stereo record to about 20 c./s.

In FIGURE 5, 1 and 3 are microphones, 4 and 6 are preamplifiers, 30 is an oscillator, 31 is a preamplifier, 32 and 36 are power amplifiers, 34 is a frequency modulator, 35 is a preamplifier and 33 and 37 are driving devices. Generally, in a low range frequency section, the cross talk between the recording walls on both sides of a stereo groove is so considerably low that, even if the signals are respectively recorded on both recording walls, they will not be likely to mix with each other. Therefore, in this embodiment, such two kinds of signals as are described later are recorded on these two recording walls so that the defect caused by the wow-and-flutter of a turntable which is likely to occur in the low range frequency section may be eliminated. That is to say, in the low range frequency section, the influence of the wow-and-flutter of the turntable is so high that, in recording the above mentioned signals, a basic signal of a fixed frequency having a later mentioned fixed difference from the carrier frequency of the frequency modulator 34 is oscillated, is amplified with the power amplifier 32 through the preamplifier 31, is applied to the driving device 33 and is recorded on one recording wall. On the other hand, the above mentioned signal frequency modulated by a desired recording signal S in the frequency modulator 34, is then applied to the driving device 37 through the preamplifier 35 and power amplifier 36 and is recorded on another recording wall. In reproducing the thus recorded signals there is used the apparatus shown in FIGURE 6.

In FIGURE 6, 38 is a reproducing stylus, 16 and 17 are elements, 39 and 40 are preamplifiers, 41 and 42 are low-pass filters, 43 and 44 are preamplifiers, 45 is a discriminator, 46 is a power amplifier and 47 is a controlled device. In reproduction, the two recorded signals are picked up with the reproducing stylus 38, are passed through the preamplifiers 39 and 40 and the low-pass filters 41 and 42, are amplified with the preamplifiers 43 and 44, are both supplied to the discriminator 45, are combined and discriminated (in this case, the central frequency is selected to be the difference between the above mentioned basic signal frequency and the carrier frequency), are amplified with the power amplifier 46 as electric signals from which the influence of the wow-and-flutter has been removed (because, even if the above mentioned carrier frequency fluctuates due to the wow-and-flutter or the like, the difference from the basic signal will not vary) and control the desired controlled device 47. In the frequency band above the low range frequency section are recorded desired stereo sounds. The frequency band of the above mentioned FM signal is so narrow that it is desirable to make simple sound effects or such control of other instruments as, for example, synchronous control of the above mentioned stereo record with a slide projector or a movie projector or control of a volume expansion or of compression.

As explained with reference to the above two embodiments, if said stereo records are reproduced with the above-mentioned reproducing apparatus, not only the right and left sound signals of the conventional stereo records but also one or more sound signals or control signals will be able to be taken out. When they are reproduced with an ordinary 45—45 system stereo reproducing apparatus, only the two main signals will be able to be taken out. In such case, as the modulating system is different, the above mentioned third signal will not be in the way at all and will be therefore very favorable. Thus, a so-called compatible recording and reproducing system can be obtained.

Further, the recording medium can be applied not only to the above mentioned stereo record disk but also to such magnetic tape as can record a plurality of signals or to any other medium. Particularly in case the magnetic tape is used, even in the high range frequency section the above mentioned cross talk will be so low that a plurality of signals will be able to be recorded. The modulation system of the above mentioned signals may be applied not only to frequency modulation but also to phase modulation.

I claim:

1. A multiple recording system comprising a plurality of separate signal transmission channels;

main signals as many in number as said plurality of said separate channels, said main signals having substantially the same comparatively wide frequency bands and having substantially similar signal information contents;

at least one additional signal having frequency bands comparatively smaller than the frequency bands of said main signals and having signal information contents different from those of said main signals;

means for passing said main signals respectively through each of said separate signal transmission channels;

an oscillator means producing an output signal having a desired carrier frequency;

means for frequency modulating the output signal of said oscillator means in accordance with said additional signal, side bands of said frequency modulated additional signal being outside the frequency band range of said main signals;

means for applying the output signal of said modulating means to at least one of said separate channels whereby said main signals and said frequency modulated additional signal are simultaneously transmitted; and means for recording each of said output signals from said separate channels in separate places on a recording medium respectively.

2. A multiple recording system according to claim 1, wherein the carrier frequency is selected to be substantially the upper limit of the frequency range that can be recorded in and reproduced from the recording medium, and wherein the lower side band of the frequency-modulate additional signal is utilized so that said lower side band may be above the upper limit of the frequency band of the main signals.

3. A multiple recording system according to claim 1, wherein the carrier frequency is selected to be substantially the lower limit of the frequency range that can be recorded in and reproduced from the recording medium, and wherein the upper limit band of the frequency modulated additional signal is utilized so that said upper side band may be below the lower limit of the frequency band of the main signals.

References Cited

UNITED STATES PATENTS 3,067,292 12/1962 Minter ........... 179—100.4

BERNARD KONICK, *Primary Examiner.*

V. P. CANNEY, *Assistant Examiner.*